May 4, 1965  H. L. SMITH, JR  3,181,605
UNIFORMLY HEATED ROTARY DRUM
Filed June 20, 1961  5 Sheets-Sheet 1
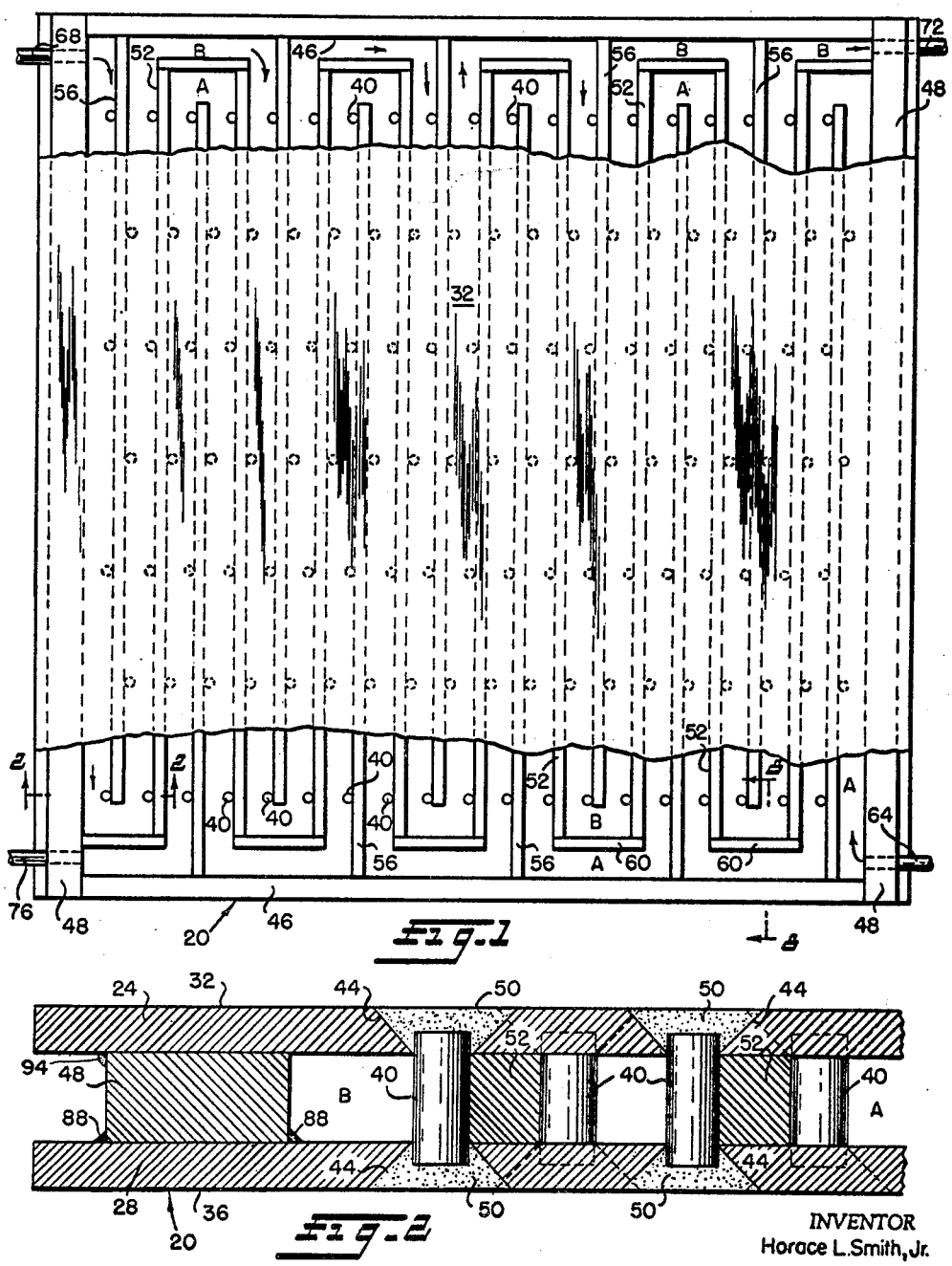
INVENTOR
Horace L. Smith, Jr.
BY
ATTORNEYS May 4, 1965  H. L. SMITH, JR  3,181,605
UNIFORMLY HEATED ROTARY DRUM
Filed June 20, 1961  5 Sheets-Sheet 3

INVENTOR
Horace L. Smith, Jr.

BY *Strauch, Nolan + Neale*

ATTORNEYS

May 4, 1965        H. L. SMITH, JR        3,181,605

UNIFORMLY HEATED ROTARY DRUM

Filed June 20, 1961        5 Sheets-Sheet 4

INVENTOR
Horace L. Smith, Jr.

BY    Strauch, Nolan & Neale

ATTORNEYS

May 4, 1965  H. L. SMITH, JR  3,181,605
UNIFORMLY HEATED ROTARY DRUM
Filed June 20, 1961  5 Sheets-Sheet 5
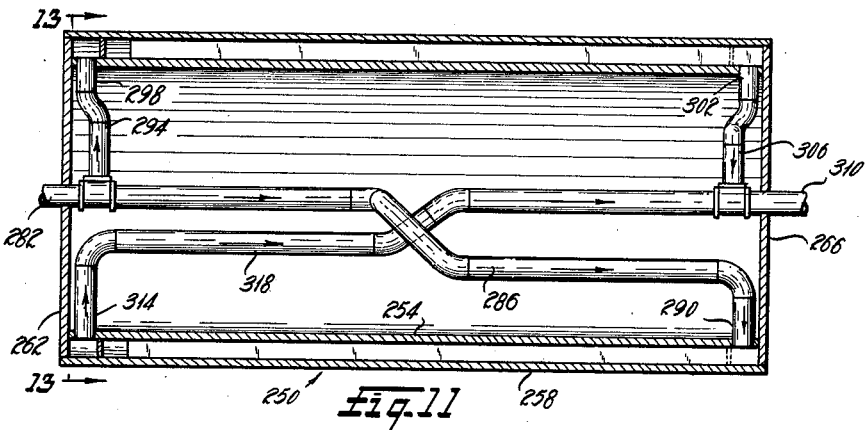
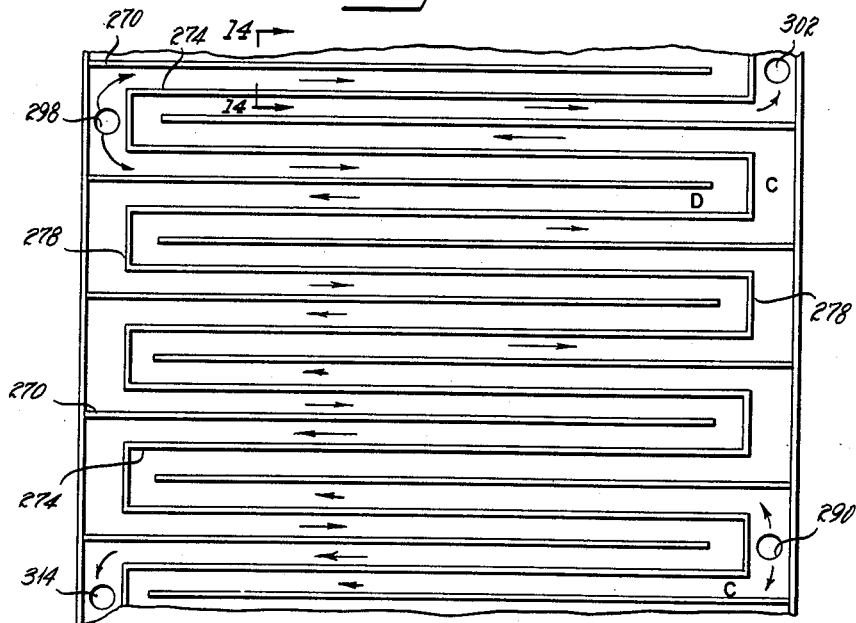
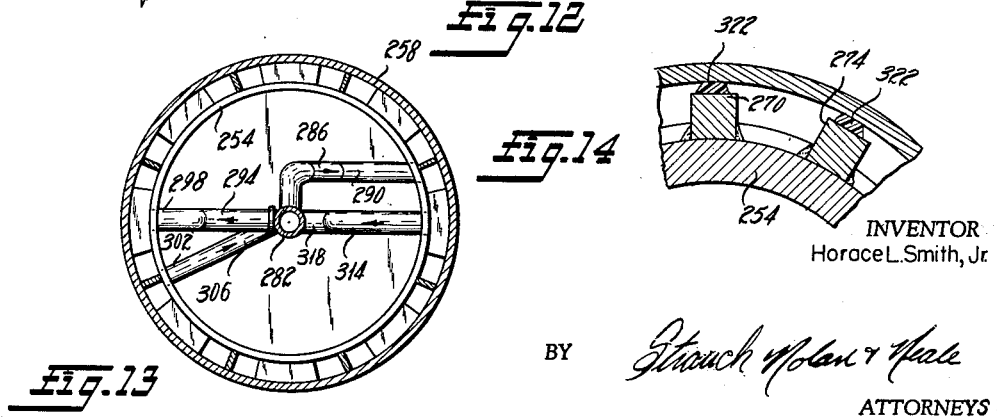
INVENTOR
Horace L. Smith, Jr.
BY
ATTORNEYS

United States Patent Office 3,181,605
Patented May 4, 1965

3,181,605
UNIFORMLY HEATED ROTARY DRUM
Horace L. Smith, Jr., Richmond, Va., assignor to Hupp Corporation, Cleveland, Ohio, a corporation of Virginia
Filed June 20, 1961, Ser. No. 118,439
5 Claims. (Cl. 165—90)

This application is a continuation-in-part of my application Serial No. 98,873, filed March 28, 1961, now abandoned.

This invention relates to heat transfer apparatus such as drums and to platens of relatively large size utilized in the production of adhesively bonded laminated panels, and to methods of their construction.

Multiplaten hot plate presses are used extensively in the manufacture of plywood, laminated plastic products, etc. The conventional design may consist of platens of hollow or channeled construction, which are heated as by steam flowing through passageways formed therein. Between opposite faces of such platens, a labyrinth is provided for the conduction of a heated fluid to elevate as uniformly as possible, the temperature of the entire face of the platen. Drums for flatwork ironing may have such labyrinth construction.

The formation of such a labyrinth is one of the major problems in current methods of platen and drum construction since the labyrinth must be constructed between two metallic plates where working space is extremely limited and the labyrinth must be fluid tight to contain the heating fluids such as commonly employed steam under pressures which may be relatively high. When the platen is made of a single piece of material, one method resorted to in the past for forming the labyrinth has been to drill holes longitudinally and transversely between the opposite exposed faces of the platen. This requires considerable skill and hence has proven expensive in applications where it was done successfully. If the platens are cast, the labyrinth may be formed by coring the mold. This, too, is an expensive procedure and, at times, uncertain of results as to the precise form and free-flowing condition of the labyrinth. Another practice is the welding of partition strips between top and bottom plates, as set forth in United States Patent No. 2,627,290. This procedure has the disadvantage of being usable only with platens of relatively large thicknesses, in the order of 12 inches for example.

Drums or rolls such for example as shown in United States Patent No. 2,837,833 to Coudriet pose a similar problem in construction of the labyrinth. In the construction of drums such as shown in FIGURES 2 and 3 of the Coudriet patent, the welding of the helical strips to the inner and outer cylindrical shells pose manufacturing problems of considerable magnitude.

Some hot plate press operations simply require keeping the platens hot whereas others require heating the platens for a certain time duration, as for a curing portion of the cycle, and then cooling the platens, and consequently the product, before pressure is relieved. When steam is used to heat the platens, usually cold water is circulated through the platens to remove the heat. This process is satisfactory only for certain operative conditions however. In many instances, higher platen temperatures are desirable but cannot be obtained due to practical pressure considerations. Moreover, many prior art platens cannot be adequately heated at a uniform temperature over their entire surfaces, and therefore create uneven curing or other heat treating effects.

Briefly, the above and other disadvantages of the prior art devices are overcome by the present invention which provides a platen apparatus and a method of construction therefor, which enables the manufacturer to easily assemble a platen unit without welding partition strips between the opposed platen contact plates, or without rolling the contact sheets as proposed in United States Patent No. 2,827,552, or using other more expensive and generally less satisfactory prior art methods of platen construction. Accordingly, the present invention provides novel partition elements forming one or more platen fluid flow channels and improved means which hold the platen contact plates in fixed spaced relation. In certain embodiments, novel spacer elements are provided which are easily, permanently secured in place as by external plug welding or other suitable means. Thus, as will become more apparent from the following description, the various platen or drum elements of the present invention may be assembled with free and open access due to the fact that the partition elements may be assembled in their final positions on one plate and the other plate assembled over the partition elements. For drum or roll constructions, the outer cylindrical member is slid over an upper deformable edge on the partition elements to complete the assembly. For platen constructions, the welding or the like fixing takes place after the second plate is positioned over the partition elements, and when the latter step is carried out, the welds for example, may be applied to external portions of the platen. Thereafter, for platens conventional machining steps (necessary in this as well as prior art processes) may be performed to give the platen the desired finish necessary for platen service. By the present invention a labyrinth for the conduction of fluid through the platen in a tortuous sinuous path is accomplished yet the labyrinth forming partition elements need not be permanently secured to either of the platen contact plates, thus minimizing the most difficult problem yet encountered in platen construction.

The present invention may obtain uniform platen or drum heating by providing countercurrent fluid flow in adjacent channels, each of which is of substantially the same length and has substantially the same heat loss, whereby the hot sections of one channel maintain or equalize the cooler temperature of the adjacent channel. Also, to obtain higher and more uniform temperatures without increasing pressure requirements, and in fact decreasing such requirements, it is proposed by the present invention to utilize a liquid instead of steam as the heating and cooling fluid. Although any suitable liquid may be used, a preferred liquid which creates almost no internal pressure at temperatures in the order of 500° F. or higher, is "Aroclor 1248," which is a yellow tinted chlorinated hydrocarbon composition characterized by its non-flammability, low vaporization loss, stability toward heat, and stability towards acids and alkalies.

In addition to their usefulness in the production of laminates, the platens of the present invention may also be utilized as flatwork irons in laundries for example, or in other uses where a flat or cylindrical heated or cooled surface is desirable.

Accordingly, it is an object of the present invention to provide a novel heat transfer platen and drum construction embodying plates held in spaced relation by partition elements which also provide an intermediate labyrinth structure forming at least one tortuous flow channel through which heating or cooling fluid may be flowed.

Another object of the present invention is to provide a novel platen construction having countercurrent flow channels therein for obtaining and maintainig relatively uiform temperature conditions on contact surfaces of the platen.

Another object of the invention is to provide novel channel forming elements such as partition elements interposed between the contact plates of the platen, which are strong, easily positioned in the device, and which improve the flow characteristics of heating and coolant fluids through the platen.

Still another object of this invention is to provide novel contact plate spacer elements and novel means for securing the spacer elements to the plates.

Still a further object of the present invention is to provide spacer studs to space the contact plates of said device, and facilitate location of the spacers in aligned apertures formed in the plates for securing the plates together.

It is another object of the present invention to provide a novel method of constructing a heat transfer device having a pair of spaced plates with partition elements serving both as means for spacing the plates and means for defining a tortuous sinuous flow path wherein the partition elements are first fixedly located on one of the plates prior to the time when the other plate is secured to the device.

A further object is to provide a novel method of assembling a platen or drum of the present invention including forming corresponding aligned apertures in the platen contact plates, placing partition elements in position to form at least one fluid flow channel, and fixing spacer elements in the apertures of the plates whereby the plates are held in fixed spaced relationship.

Another object of this invention is to provide a novel method of assembling a platen comprising forming aligned apertures in opposed contact plates of said platen, locating spacer elements between said plates and inserting and fixing the spacers in the apertures as by plug welding for example.

Another object of this invention is to provide a novel drum-like device having flow channels therein for circulating heating or cooling fluid in either countercurrent or unidirectional manner, and also to provide a novel method of assembling the drum-like structure in a simple, but effective way.

Other objects and advantages of the present invention will become apparent to those skilled in this art from the following description, appended claims, and the accompanying drawings wherein:

FIGURE 1 is a plan view of a platen (parts broken away) having formed therein, countercurrent fluid flow channels by means of partition elements;

FIGURE 2 is an enlarged vertical section view taken along line 2—2 of FIGURE 1;

FIGURE 11 is a plan section view of a drum or roll embodiment of the present invention taken through the central axis thereof;

FIGURE 12 is a development of approximately one-half the surface of the drum or roll of the embodiment shown in FIGURES 11 and 13, showing the preferred channel arrangement;

FIGURE 13 is an end elevation in section taken along line 13—13 of FIGURE 11; and FIGURE 14 is a fragmentary elevation view in section, taken along line 14—14 of FIGURE 12.

*Countercurrent flow platen and assembly*

Figure 3:
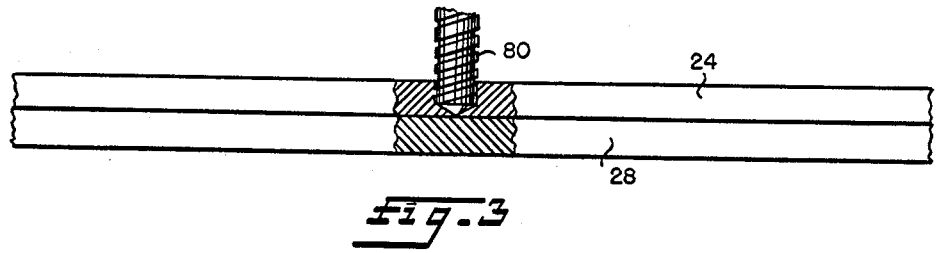
FIGURES 3, 4 and 5 are views similar to FIGURE 2 taken at various stages in the assembly of the platen illustrated in FIGURES 1 and 2.

Referring now to the drawings, FIGURES 1 and 2 illustrate a platen construction indicated generally as 20 in accord with the present invention having fluid flow channels A and B. The platen has a pair of opposed contact plates 24 and 28 (referred to herein as upper plate 24 and lower plate 28 as shown in the drawings for ease of description), each of which has a finished outer contact surface 32, 36 respectively for engaging the materials being worked. Plates 24 and 28 are relatively thin rectangular members and are held in spaced relationship by a series of spacer elements such as studs 40 which extend through aligned corresponding apertures 44 in plates 24 and 28, and by side and end frame members 46, 48. The studs are preferably permanently fixed in apertures 44 as by plug welds 50 which are preferably composed of metal of substantially the same composition as plates 24 and 28, or at least of a material which has substantially the same coefficient of thermal expansion as the plate material. Plug welds 50 are shaped in countersunk fashion to afford more weld surface, admit of easier welding, and due to their shape, insure against being pulled through the plate while in service.

Studs 40 are arranged in staggered rows across the platen. Each such row provides a pocket for receiving a partition element 52 or 56 which is a wall member preferably of rectangular cross section extending between the inner surfaces of plates 24 and 28 and between studs 40 of each row of studs as shown in FIGURE 1. The partition elements need not be welded in place although they may be lightly tack welded for ease in handling during assembly if desired. It is not essential that there be a fluid tight seal between the upper and lower surfaces of the partitions and plates 24 and 28 since slight fluid leakage to or from channel A or B will not significantly affect the desired temperature conditions of the plates.

Partitions 52 terminate short of side frame members 46. The common ends of adjacent partitions 52 are joined by a closure piece 60, and a continuous, sinuous partition wall is thereby formed by partitions 52 and closures 60 as shown in FIGURE 1, which wall is terminated at its opposite ends by a closure 60 engaging an end wall 48. Partitions 52 and closures 60 may be pre-assembled before use as by welding, while the end closures which engage end frame member 48 may merely abut the walls or be lightly tack welded thereto since it is not essential to provide a fluid tight seal between these members.

Partitions 56 project alternately from opposite side frame members 46 in which they may be received in a groove or merely abut as shown, into the fluctuations of the wall formed by partitions 52 and closures 60, but preferably terminate short of each closure 60. This arrangement creates the two substantially parallel but completely separate fluid flow paths A and B for countercurrently conducting fluids through the platen. Alternatively, as will be hereinafter described in connection with FIGURES 8, 9 and 10, partitions 56 may extend from a side frame 46 to a closure 60 for supporting engagement therewith, and the end of partition 56 which engages the closure may be perforated or otherwise provided with openings to permit passage of the fluid in the particular channel in which it is located.

A fluid inlet 64 and a fluid outlet 76 at opposite corners of the platen extend through end frames 48 into channel A at its opposite ends, while inlet 68 and outlet 72 also extending through end frames 48, are open to channel B at its opposite ends. Each of the inlets and outlets may be conventionally adapted for coupling with fluid supplying devices such as pipes, hoses, or the like as is well known.

In operation heating or cooling fluids are circulated through channels A and B countercurrently so that the average temperature at any place on the platen will be approximately the same. Assuming that the heat loss, usually about 50° F. for fluids entering a 66 x 134 inch platen at 550° F., is substantially the same for fluids in channels A and B which are of approximately equal length, it will be apparent that the channels A and B, when considered together at any point, contain fluids which have combined temperatures eqivalent to the mean temperature of the liquids in the system; and by heat transfer through the partitions the fluid temperature in adjacent channel sections will tend to equalize and thereby heat the platen surfaces 32 and 36 more uniformly than would be the case in a single channel platen construction. This heat transfer effect is enhanced by the presence of studs 40 and the sharp right angle intersections of partitions 52 with closures 60, which create turbulence in the flow channels and thereby increase the heat transfer coefficient. Also, the thermal conductivity of plates 24, 28 themselves tend to make the platen surface temperature more uniform.

Studs 40, plates 24 and 28, and partitions 52 and 56 are preferably made from the same metal so that these will have equal thermal expansion properties. This will reduce stresses which might produce undue fluid communication between channels A and B, or produce uneven section of the surfaces 32 or 36 of the platen. The latter is important when it is considered that the surfaces are generally smooth tool finished parallel to within .005 inch.

The preferred method of assembling the platen illustrated in FIGURES 1 and 2 is shown in FIGURES 3, 4, 5 and 2 respectively. As brought out above, the primary difficulty in prior construction methods revolved around the problem of securing the partition elements in position because relatively thin platens are desirable and the working space between the contact plates posed practical construction limitations since it was necessary to work between the plates. By the method of the present invention, it is merely necessary to place the elements in their desired position and thereafter, by a process entirely external to the platen, the component elements are permanently secured together. This is made possible by providing apertures 44 in plates 24 and 28 whereby plug welds 50 may be applied.

Accordingly, the first step (illustrated in FIGURE 3) in the novel assembly method of the present invention is to combine the upper and lower plates 24 and 28 as by clamping and drill or otherwise form apertures therein as by tool 80. Simultaneous drilling of the plates insures that the apertures thus formed will be in alignment and will therefore receive the opposite ends of a stud 40 without canting.

Figure 4:
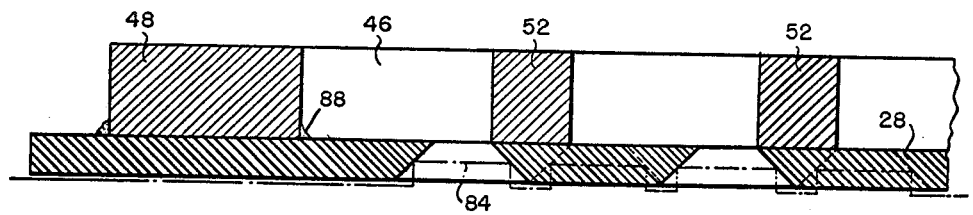

After apertures 44 are formed, and countersunk if desired, lower plate 28 is placed on an assembly jig (indicated in phantom lines in FIGURES 4 and 5) having upstanding projections 84 which extend upwardly into apertures 44. As shown in FIGURE 4, side frame members 46 and end frame members 48 with preformed inlets and outlets if desired, are next positioned and permanently welded at 86 (shown in FIGURES 8-10) and 88 respectively, to the bottom plate on both sides thereof. Partitions 52 and 56 are placed in position between the staggered apertures 44 in each row of apertures. To insure that the partitions retain their positions during assembly and subsequent service, it is preferable to lightly tack weld them in place, although the engagement of studs 40 on opposite sides of the partitions will usually be adequate.

Figure 5:
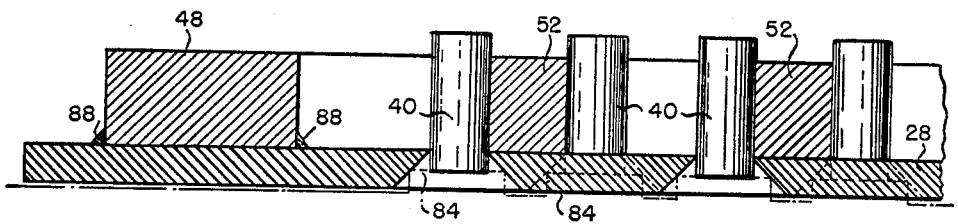

Having sub-assembled lower plate 28, side and end frames 46 and 48, and partitions 52, 56 and 60, studs 40 are positioned in openings 44 as shown in FIGURE 5 and plate 24 is then placed over the studs and onto the partitions and frame members in the manner shown in FIGURE 2, to permit studs 40 to enter the corresponding apertures 44 formed therein. Projections 84 on the assembly jig which are a predetermined uniform height hold the lower ends of studs 40 above surface 36 of lower plate 28 by approximately a distance equal to the height of the projections, and likewise space the upper ends of studs 40 a similar distance below surface 32 of upper plate 24. This affords more than adequate area in apertures 44 for plug welds 50, and eliminates the necessity of machining the ends of studs 40 during the exterior platen surface finishing phases of construction which would be undesirable.

After plate 24 is positioned, plug welds 50 in the upper plate are made for fixing studs 40, and welds 92 and 94 are also made to secure plate 24 to the side and end frame respectively. It will be appreciated that it is only necessary to apply welds 92 and 94 to the exterior side of frame members 46 and 48, and once upper plate 24 has been placed in position no work whatsoever is required to be carried out between the frame members and in the space between plates 24 and 28.

Since at this stage, all parts are fixed relative to each other, the assembly may be completed by merely inverting the platen and applying welds 50 to studs 40 and plate 28 in its respective apertures 44. Thereafter surfaces 32 and 36 are ground at least once, and preferably twice, to provide smoothness and uniformity.

Thus, having described the preferred method of platen assembly, it will be apparent to those skilled in the art that various modifications can be made while the prime advantages thereof may be retained. Accordingly, instead of first tack welding the partitions in place on lower plate 28, studs 40 may be welded in upper plate 24 and partitions then placed between the studs and frame members secured to the plates. Or, instead of locating the studs prior to positioning the upper plate, the latter can be placed over the partitions already assembled on lower plate 28, and the studs inserted through the aligned apertures of both plates. Still another alternative is to employ shouldered studs 140 shown in FIGURE 7 which, by virtue of the shouldered portions, automatically space the stud ends in the contact plate apertures with reference to their depth. While various other modifications such as the order of carrying out the process steps may be made, nevertheless, the basic features of the present invention remain in that the platen is provided with partition walls forming two substantially parallel flow paths between opposed contact plates. The studs and frame members are fixed by means applied exteriorly of the platen, or at least during a stage of assembly in which there is free working access to the parts involved. Further, since the studs are positioned in staggered rows to hold the partition members in place, permanent welding of the partitions to the plates is obviated.

Single channel platen

Figure 6:
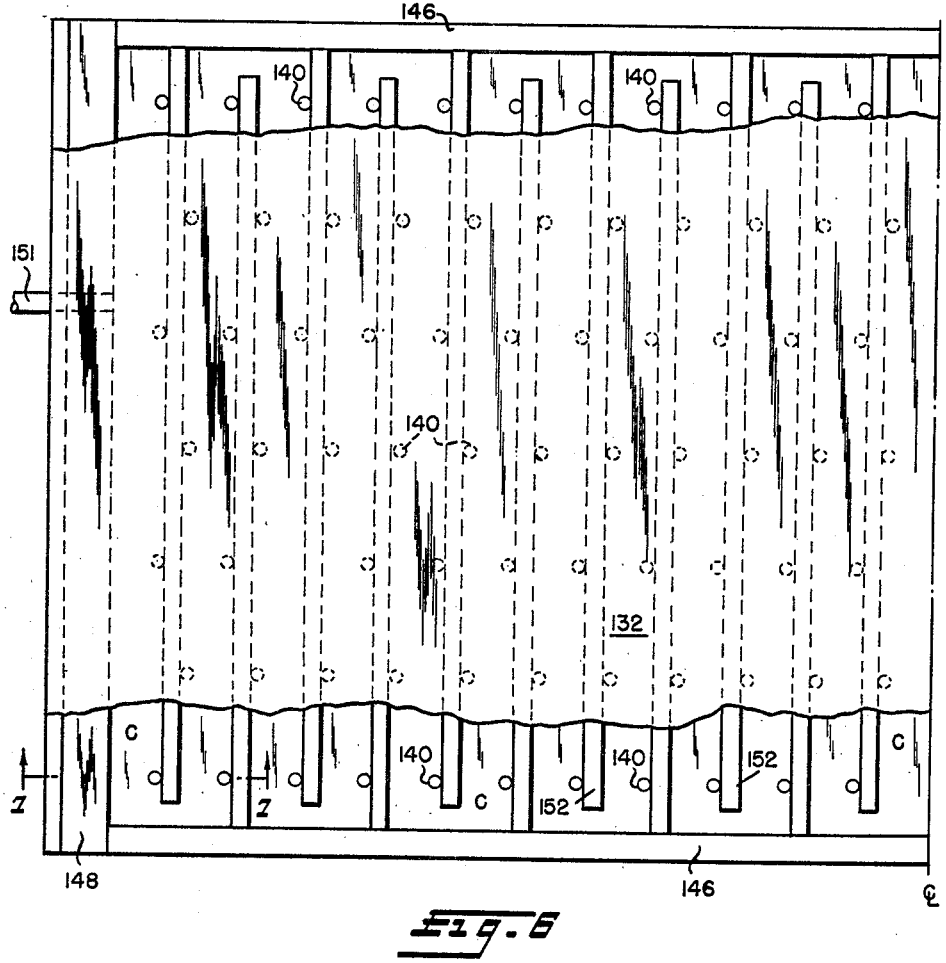
FIGURE 6 is a plan view, parts broken away, of another platen construction of the present invention embodying a single fluid flow channel.
Figure 7:
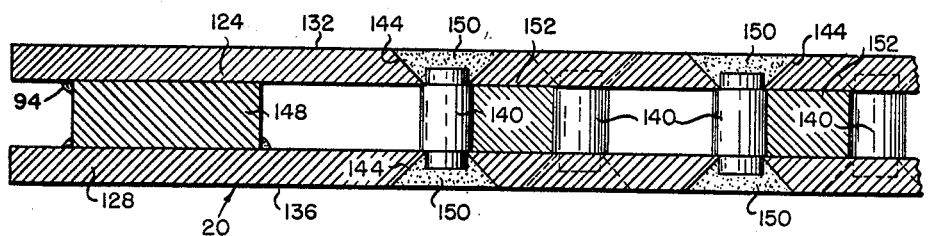
FIGURE 7 is an enlarged elevation view in section taken along line 7—7 of FIGURE 6.

FIGURE 6 illustrates in plan view one half of a substantially symmetrical platen embodiment of the present invention wherein a single fluid flow channel C is formed for controlling the contact surface temperatures of the platen. FIGURE 7 is a partial elevation view in section taken along line 7—7 of FIGURE 6.

Platen contact plates 124 and 128 having contact surfaces 132 and 136 respectively, are fixed together in spaced relation by studs 140, which in this embodiment, have a thick body portion with reduced pilot end portions and shoulders on each end thereof for engaging the inner surfaces of plates 124 and 128, and thereby spacing the stud pilot portions properly into apertures 144 in the plates. Here again, it is preferred to utilize plug welds 150 in countersunk shape for fixing the studs and plates together. Alternatively, of course, the dowel cut studs 40 shown in FIGURE 2 could be utilized.

The shouldered studs 140 are easier to assemble in the platen construction, but since they require an extra machining operation to form the pilot portions at each end thereof, the studs 40 as shown in FIGURE 2 are preferred from an economical viewpoint. It is apparent, however, that either the shouldered stud or cylindrical stud may be used interchangeably.

The platen further is comprised of side frame members 146 and end frame members 148 with a fluid inlet or outlet connection 151 on each opposite end of channel C. These frame members are similar to those illustrated in connection with the embodiment of the invention illustrated in FIGURES 1 and 2, and are secured by welds or the like to the contact plates 124 and 128 similar to the manner in which frame members 46 and 48 are shown and described connected to plates 24 and 28.

The partitions 152 are all similar. Each is relatively long and narrow, and extends from a side frame member 146 toward the opposite side frame 146. The partitions are of rectangular cross section and span the space between the inner surfaces of plates 124 and 128. The arrangement of partitions 152 is such that going from one end frame member 148 to another, the partitions 152 extend alternately from the side frame members 146, but do not extend completely across the platen to the opposite side frame member. This arrangement of partitions creates a single continuous, sinuous channel C for guiding fluids circulated through the platen back and forth from side frame member to side frame member as the fluid proceeds in the general direction of flow from platen inlet to outlet.

The method of assembling the embodiment of the invention shown in FIGURES 6 and 7 may be that described in connection with the countercurrent apparatus of FIGURES 1 and 2, with the exception that by using the shouldered studs 140 the necessity of an assembly jig is obviated.

It is obvious that the single channel platen is less expensively constructed and therefore preferred where uniformity of heat application is not sufficiently critical to warrant the use of a countercurrent flow platen, particularly since relatively uniform temperatures are applied by the single channel construction, albeit not to the refined degree of the multi-channel countercurrent service.

Platen apparatus modification

Figure 8:
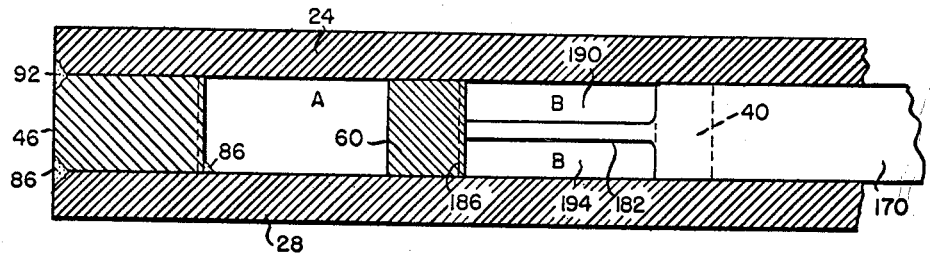
FIGURE 8 is an enlarged view in section taken along line 8—8 of FIGURE 1 and illustrating one form of novel partition elements of the present invention.
Figure 9:
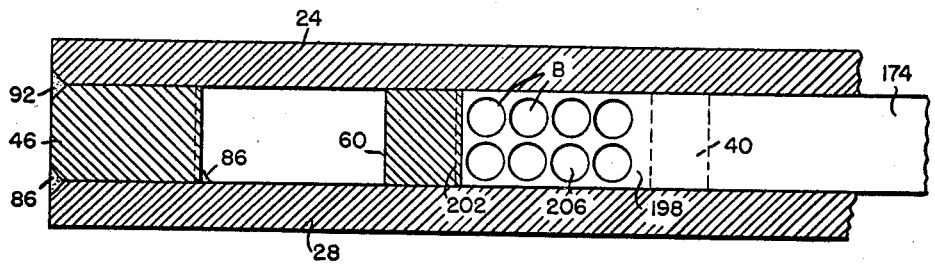
FIGURE 9 is another section view similar to FIGURE 8 but illustrating another form of novel partition elements which may be utilized in forming a flow channel or channels in the platen construction of the present invention.
Figure 10:
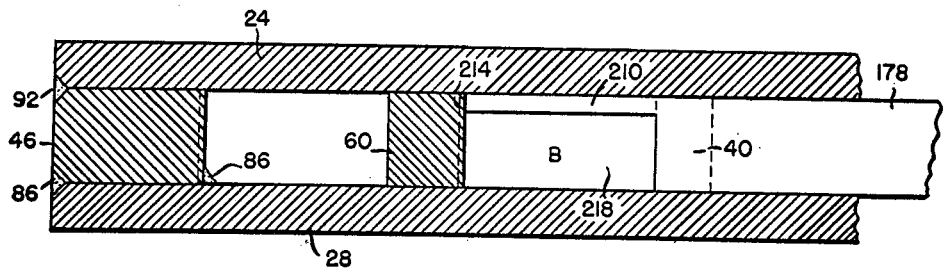
FIGURE 10 is still another section view similar to FIGURE 8 but illustrating another form of novel partition element which may be utilized in accord with the present invention.

FIGURES 8, 9 and 10 illustrate modifications of partitions which may be utilized in either the single or countercurrent flow channels in the platen of the present invention. For simplicity of description, the section views shown in these figures have been taken through the countercurrent flow apparatus of FIGURE 1. It will be understood however, that the partitions are equally useable in the single channel apparatus.

In each of FIGURES 8, 9 and 10, opposed contact plates 24 and 28 are shown spaced by side frame members 46, closure 60, and a partition 170, 174 and 178, respectively. Flow channel A is formed between side frame member 46 and closure 60, while channel B is formed between closure 60 and the partition.

In FIGURE 8, partition 170 is provided with a relatively flat extension 182 of the same width as the partition. The extension extends to closure 60 where it may merely abut closure 60, or be engaged therewith by a slot such as shown in FIGURE 8 and designated 186, or it may be welded to closure 60 before top 24 is assembled onto the platen. The extension is a simple means of providing correct endwise spacing for the partition although it may also provide the partition with additional lateral support and increase the turbulence of the fluid flowing through channel B inasmuch as the flow area is restricted to passageways 190 and 194.

In FIGURE 9, partition 174 is provided with a modified extension 198 which preferably extends into a slot 202 in closure 60 and is provided with a series of apertures 206 which increases turbulence as it permits fluid to flow through channel B.

In FIGURE 10, another form of extension 210 is provided for partition 178 which may also engage a slot 214 in closure 60. Here again, the extension 210 may be of the same width as partition 178 and provides ample space for the passage of fluid through passageway 218.

Drum embodiment

Illustrated in FIGURES 11–14 is a drum 250 suitable for web and belt drying for example, where a heated or cooled uniform temperature roller surface is desired. The drum surface may be controlled by fluids flowing countercurrently or unidirectionally through channels formed in the drum in a manner similar to that described in connection with the platen embodiments above.

Drum 250 is comprised of an inner cylindrical shell 254, an outer shell 258 substantially concentric with shell 254, and end wall plates 262 and 266. Fluid flow channels are formed between shells 254 and 258 by longitudinal partitions 270 and intermediate partitions 274 which may have a rectangular cross section and be straight as apparent from FIGURE 14. Partitions 270 extend alternately from an end plate 262 or 266 over a major portion of the length of the drum. Each intermediate partition 274 is positioned between a pair of partitions 270. Neither end of an intermediate partition contacts an end plate. The common ends of partitions 274 which extend beyond the end of a partition 270 are joined by a closure partition 278 to form a continuous, sinuous wall comprised of partitions 274 and 278 which divides the space between partitions 270 into two adjacent flow channels C and D.

A fluid inlet connection 282 extends through an opening in end plate 262. As fluid enters the drum it is introduced into channel C by branch conduit 286 (as indicated by the arrows in conduit 286) through channel inlet 290, and into channel D by branch conduit 294 through channel inlet 298 which is substantially 180° from channel C inlet 290. As shown in FIGURES 12 and 13, a fluid stream enters channel C, divides, and is forced in opposite directions (indicated by arrows) toward channel outlet 302 which is in communication with a branch outlet conduit 306 of the primary outlet connection 310 extending through end plate 266.

Similarly, fluid entering channel D is divided and forced toward channel outlet 314 which communicates with a branch outlet conduit 318 connected to outlet connection 310. As is apparent, fluid flow in adjacent portions of channels C and D is countercurrent thus providing uniform temperature distribution and other advantages as described above in connection with the countercurrent flow platen shown in FIGURES 1 and 2.

Drum 250 may be readily and easily constructed. As illustrated in FIGURE 14, partitions 270 and 274 may be positioned on inner shell 254 prior to drum assembly by any suitable method such as welding or by screws inserted through openings in the shell into the bottom side of the partition.

The top surface of each partition is provided with a longitudinal interference fit seal 322 secured thereto as by longitudinal tongue and groove or by temperature resistant adhesive means. Each seal is co-extensive with the length of the partition upon which it is mounted and may be of metal, plastic, or other deformable material resistant to changes in temperature and to the fluid flowing through channels C and D.

To assemble the drum, all partitions are fixedly located, as by welding, on inner shell 254 in the desired flow path arrangement and the inner shell and partitions are then forced longitudinally into outer shell 258. The deformable seal strips bend over or otherwise deform by forces applied by the inner surface of outer shell 258. The force fit results in outer shell 258 being spaced from inner shell 254 by partitions 270, 274 and 278 with seal members on the upper edges of the partitions providing adequate seal between channels C and D. The end plates may be secured as by welding to the shells at anytime; however, it is preferred that one end be welded or otherwise secured to the outer shell prior to forced insertion of the inner shell, and the other end plates sealed and secured in a final assembly phase.

Since fluid streams entering either channel C or D split, each portion of the stream travels only through one-half the length of the channel which it entered and consequently through only one-fourth of the length of flow channels in the drum. Therefore, in effect, there are actually four different streams of fluid flowing in the device which, due to the relatively shorter channel lengths, reduces inlet-outlet temperature differentials resulting in better temperature uniformity on the drum surface.

Instead of the countercurrent flow arrangement shown in FIGURES 11-13 partitions 274 and 278 may be eliminated and a single flow channel utilized.

Also, instead of providing the top edge of the partitions 270, 274 and 278 with a deformable sealing strip, the inner surface of drum 258 may have a layer of similar material applied thereto for the same purpose.

In addition, partition extensions such as illustrated and described in connection with FIGURES 8, 9 and 10 may be utilized in the drum construction if desired.

It is the current commercial practice to dry paper, for example sheets of tissue paper, by a steam heated "Yankee Drier." The wet incoming sheet passes around a large roll which presses the sheet in intimate contact against the "Yankee Drier" to squeeze out film and air that would otherwise have a deleterious effect on the final product. Roller loads are normally in the order of ten to fifteen thousand pounds and frequently result in deflecting the surface of an average size drier (14 feet in diameter, 15 feet wide) by as much as fifty-five thousandths of an inch in the center thereby resulting in a non-uniform application of heat and pressure to the tissue and a consequent lack of final product uniformity. One particular advantage of the present invention is that it may replace a "Yankee Drier" in and remarkably improve a paper drying operation by eliminating the previous drier deflection problems and increasing the drier speed capacity and quality of product being produced at approximately a mile a minute. At such speeds (approximate drum speeds are in the order of 650-900 r.p.m. for 14 foot diameter drums) it is obvious that temperature uniformity is important across the drum surface.

The partition elements positioned between inner and outer shells 254 and 258 are spaced sufficiently close together as illustrated in FIGURES 12-14 to act as stiffening ribs capable of supporting shell 258 and virtually eliminate deflection and lack of product uniformity problems. Speed is increased by heating with a high boiling point fluid capable of being heated to relatively higher temperatures than steam with no appreciable increase in equipment pressurization requirements. Prior driers have been seriously retarded in capacity simply because steam cannot be heated above about 353° F. without producing excessively high pressure for practical purposes. Practical pressure construction considerations have therefore limited maximum operating temperature.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Heat exchange apparatus adapted to have a fluid heat transfer medium circulated therethrough to maintain an external surface of said apparatus at a uniform predetermined temperature, comprising:
   (a) concentric, spaced apart, cylindrical inner and outer shells of substantially equal length, both of said shells having a substantially uniform thickness throughout and the radial distance between said shells being substantially greater than the thickness of either of said shells and substantially smaller than the inner radius of the inner shell;
   (b) end walls fixed to said shells at the opposite ends thereof;
   (c) longitudinally extending, radially oriented, equi-angularly spaced partitions separating and spanning the space between the inner and outer shells, said partitions being first members distinct from said shells and fixed therebetween and the thickness of said members being substantially uniform and substantially less than the distance between adjacent partitions;
   (d) means including second members distinct from said shells and said partition members and fixed thereto connecting the passages between said partitions into at least two independent, internested, labyrinthine flow channels extending longitudinally of and around the periphery of the heat exchange apparatus and having a length which is a multiple of the length of said shells; each of said passages being adjacent a passage in another of said channels;
   (e) means comprising a heat transfer fluid supply and return system for introducing a heat transfer fluid into and causing it to flow in opposite directions through said channels; and
   (f) means by which said apparatus can be rotated about an axis coincident with the centerline of said cylindrical inner and outer shells.

2. Heat exchange apparatus as defined in claim 1:
   (a) wherein the partitions and the connecting means are fixed to one of said shells; and
   (b) including a deformable sealing strip between the opposite edges of said partitions and connecting means and the other of said shells to isolate said internested flow channels from each other.

3. Heat exchange apparatus as defined in claim 1, wherein the heat transfer fluid supply and return system comprises:
   (a) a main inlet conduit extending through one of said end walls to the interior of said inner shell and having a first portion concentric with the centerline of said inner shell and a second portion communicating with said first portion and with one of said flow channels at a point adjacent the other of said end walls;
   (b) a branch inlet conduit communicating with the main inlet conduit and with the other of said flow channels at a point adjacent the other end wall;
   (c) a main exhaust conduit extending from the interior of said inner shell through the other end wall to the exterior of the heat exchange apparatus and having a first portion concentric with said centerline and a second portion communicating with said first portion and with said other flow channel adjacent said one end wall; and
   (d) a branch exhaust conduit communicating with said main exhaust conduit and with said one flow channel adjacent said other end wall.

4. Heat exchange apparatus as defined in claim 1, wherein said fluid supply and return system is located in the interior of said inner shell.

5. Heat exchange apparatus as defined in claim 1, wherein there is a single inlet to and a single outlet from each of said channels and each channel extends substantially completely around the annular space between the inner and outer shells.

(References on following page)

References Cited by the Examiner

UNITED STATES PATENTS

| | | | |
|---|---|---|---|
| 1,443,189 | 1/23 | Malm | 165—170 |
| 1,598,721 | 9/26 | Hitchcock | 165—90 |
| 1,710,818 | 4/29 | Fasbury | 165—167 |
| 1,774,860 | 9/30 | Wendler et al. | 165—170 |
| 2,614,590 | 10/52 | Hervey | 144—281 |
| 2,627,290 | 2/53 | Berthelser | 144—281 |
| 2,862,120 | 11/58 | Onsrud | 165—170 |
| 2,867,414 | 1/59 | Maloney et al. | 100—93 |
| 2,878,560 | 3/59 | Gier | 29—455 |
| 2,961,760 | 11/60 | Horton et al. | 29—455 |
| 3,135,319 | 6/64 | Richards | 165—89 |

FOREIGN PATENTS

| | | |
|---|---|---|
| 592,654 | 2/60 | Canada. |
| 382,996 | 11/32 | Great Britain. |
| 639,007 | 6/50 | Great Britain. |
| 166,790 | 4/59 | Sweden. |

CHARLES SUKALO, *Primary Examiner.*

SAMUEL ROTHBERG, *Examiner.*